United States Patent
Volchok

(10) Patent No.: US 9,225,515 B2
(45) Date of Patent: Dec. 29, 2015

(54) SHARED PORTAL CONTEXT SESSION

(71) Applicant: Alex Volchok, Tel Aviv (IL)

(72) Inventor: Alex Volchok, Tel Aviv (IL)

(73) Assignee: SAP Portals Israel Ltd, Ra'anana (IL)

( * ) Notice: Subject to any disclaimer, the term of this patent is extended or adjusted under 35 U.S.C. 154(b) by 110 days.

(21) Appl. No.: 14/026,748

(22) Filed: Sep. 13, 2013

(65) Prior Publication Data

US 2015/0082029 A1    Mar. 19, 2015

(51) Int. Cl.
| | |
|---|---|
| H04L 9/08 | (2006.01) |
| G06F 21/00 | (2013.01) |
| H04L 29/06 | (2006.01) |
| H04L 29/08 | (2006.01) |

(52) U.S. Cl.
CPC ............. H04L 9/0819 (2013.01); G06F 21/00 (2013.01); H04L 63/00 (2013.01); H04L 63/0428 (2013.01); H04L 67/142 (2013.01); H04L 63/0815 (2013.01)

(58) Field of Classification Search
CPC ..... G06F 21/57; G06F 21/6218; G06F 21/53; G06F 21/00; H04L 9/0825; H04L 9/3247; H04L 63/00; H04L 9/0819
See application file for complete search history.

(56) References Cited

U.S. PATENT DOCUMENTS

| | | | |
|---|---|---|---|
| 4,227,253 A | 10/1980 | Ehrsam et al. | |
| 7,610,390 B2 | 10/2009 | Yared et al. | |
| 7,930,416 B2 * | 4/2011 | Miller et al. | 709/229 |
| 8,185,737 B2 | 5/2012 | Isaacs et al. | |
| 8,250,082 B2 | 8/2012 | Gwozdz et al. | |
| 8,626,865 B1 | 1/2014 | Phillips et al. | |
| 8,694,784 B1 | 4/2014 | Lekies et al. | |
| 8,706,887 B2 | 4/2014 | Jolfaei | |
| 8,719,421 B2 | 5/2014 | Mao et al. | |
| 8,799,359 B2 | 8/2014 | Stanev et al. | |
| 2002/0007317 A1 * | 1/2002 | Callaghan et al. | 705/26 |
| 2006/0212706 A1 * | 9/2006 | Jiang et al. | 713/176 |
| 2007/0156907 A1 | 7/2007 | Galchev et al. | |
| 2009/0037517 A1 | 2/2009 | Frei | |
| 2012/0023158 A1 | 1/2012 | Kashyap et al. | |
| 2014/0047351 A1 | 2/2014 | Cui et al. | |
| 2014/0108911 A1 * | 4/2014 | Damale | 715/234 |
| 2014/0189049 A1 | 7/2014 | Volchok | |
| 2014/0280691 A1 * | 9/2014 | Buerner | 709/217 |

OTHER PUBLICATIONS

U.S. Appl. No. 13/733,708, filed Jan. 3, 2013, Alex Volchok.
US 8,260,937, 09/2012, Bolohan et al. (withdrawn).

* cited by examiner

*Primary Examiner* — Chau Le
*Assistant Examiner* — Ghodrat Jamshidi
(74) *Attorney, Agent, or Firm* — Fish & Richardson P.C.

(57) ABSTRACT

The present disclosure involves systems, software, and computer implemented methods for sharing session state between portal application portlets associated with different domains. One example method includes setting a cookie for use in a portal environment. The cookie is encrypted with a key and stores at least a portion of a session state associated with a current portal session. The encrypted cookie is provided for storage at a client associated with the portal session. Execution of a portal application is initiated within the portal environment. The portal application is provided with a copy of the encrypted cookie. A copy of the key is provided to the portal application. The provided copy of the key is used to decrypt the cookie at the portal application. The session state stored in the cookie is used to set at least a portion of the session state of the portal application.

16 Claims, 6 Drawing Sheets

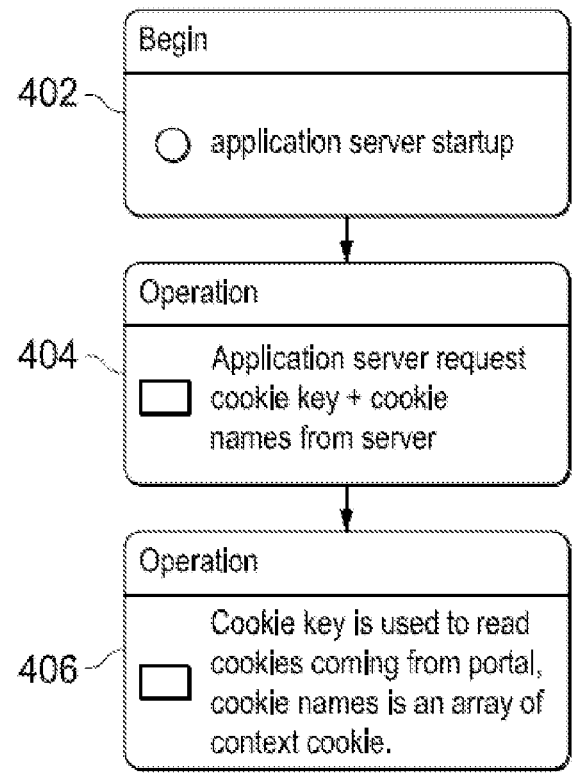
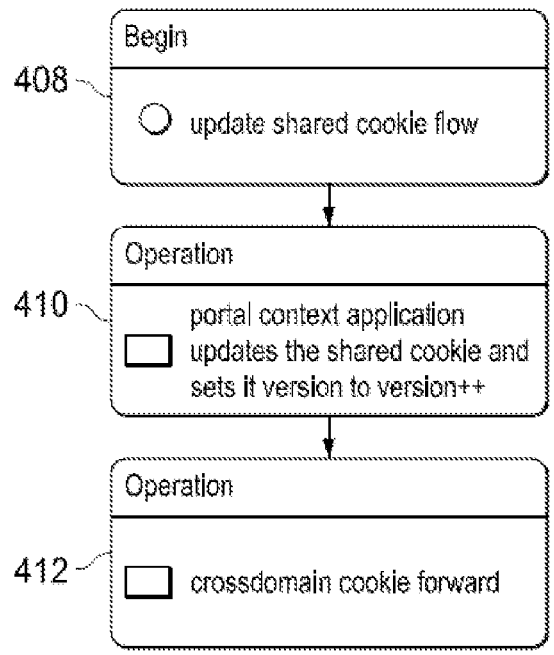

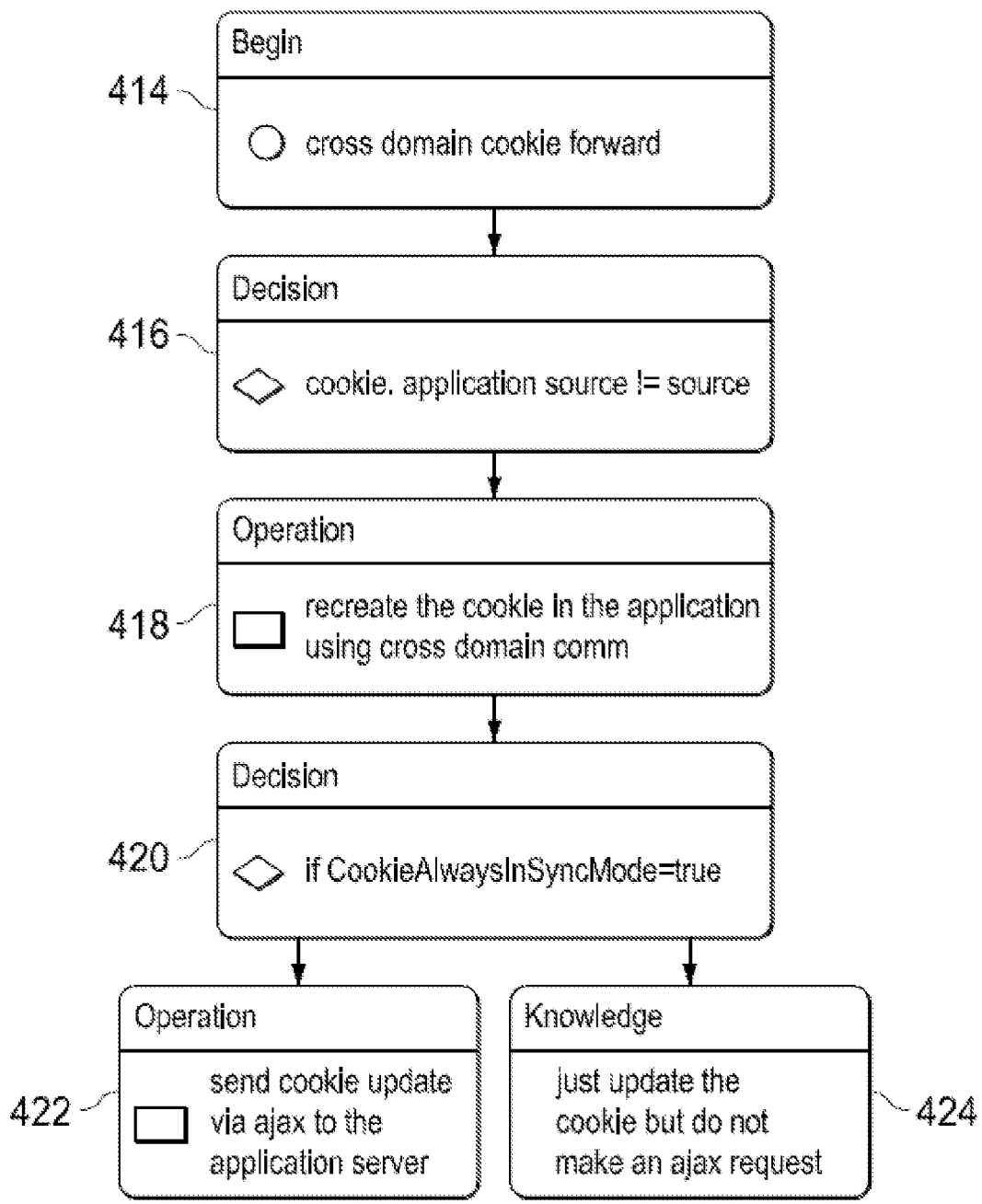

SHARED PORTAL CONTEXT SESSION

TECHNICAL FIELD

The present disclosure relates to computer-implemented methods, software, and systems for sharing session state between portal application portlets associated with different domains.

BACKGROUND

Enterprise portals are frameworks for integrating information, people, and processes across organizational boundaries. Portals can provide a secure unified access point, often in the form of a web-based user interface, and are designed to aggregate and personalize information through application-specific portlets and components. One hallmark of enterprise portals is the decentralized content contribution and content management, which keeps the information always updated. In many cases, specific portal pages may be defined by a highly experienced administrator using a portal content administration environment or a key user within a particular organization using specific tools to define aspects, relationships, and connections for and between content provided within specific portal pages.

SUMMARY

The present disclosure involves systems, software, and computer implemented methods for sharing session state between portal application portlets associated with different domains. One example method includes setting a cookie for use in a portal environment. The cookie is encrypted with a key and stores at least a portion of a session state associated with a current portal session. The encrypted cookie is provided for storage at a client associated with the portal session. Execution of a portal application is initiated within the portal environment. The portal application is provided with a copy of the encrypted cookie. A copy of the key is provided to the portal application. The provided copy of the key is used to decrypt the cookie at the portal application. The session state stored in the cookie is used to set at least a portion of the session state of the portal application.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 4A is a flowchart of an example method for initializing an application server.

FIG. 4B is a flowchart of an example method for updating a shared session cookie.

FIG. 4C is a flowchart of an example method for forwarding a cookie update.

DETAILED DESCRIPTION

A portal page can provide access to services from multiple application servers via multiple portlets or application-specific components that are included in the portal page. Each portlet or component can be associated with the domain of a particular application server, for example. A developer of a portal page may desire for the portal page and its included portlets to have access to—and to potentially change—a shared session state available to the portal page and the included portlets. However, a browser can implement a "same origin policy" prohibiting communication between objects of different domains. A same origin policy can permit scripts or other objects running on web pages originating from the same domain to access each other's data, such as methods and properties, and can prevent access to data across web pages on different domains. A same origin policy can be implemented to restrict revealing of data and performing state-changing actions, to prevent data loss, and to maintain confidentiality and data integrity.

However, the present disclosure provides methods and an infrastructure that allows portal page components to communicate changes to a shared session state by forwarding updates to a shared session cookie which represents the shared session state using a cross-domain communication technique. For example, communication can occur via iFrames associated with respective components. Sending messages using iFrame components can overcome, for example, a same origin policy implemented by the browser. For example, an iFrame component can be configured to be associated with a particular application server domain while being embedded in a portal page that is associated with a different, portal server domain. Sharing session state in a shared session cookie that is communicated through cross-domain communication can overcome the same origin policy and can also provide a common area in which to share session state between servers which otherwise might store session data in different ways and in different locations.

Figure 1:
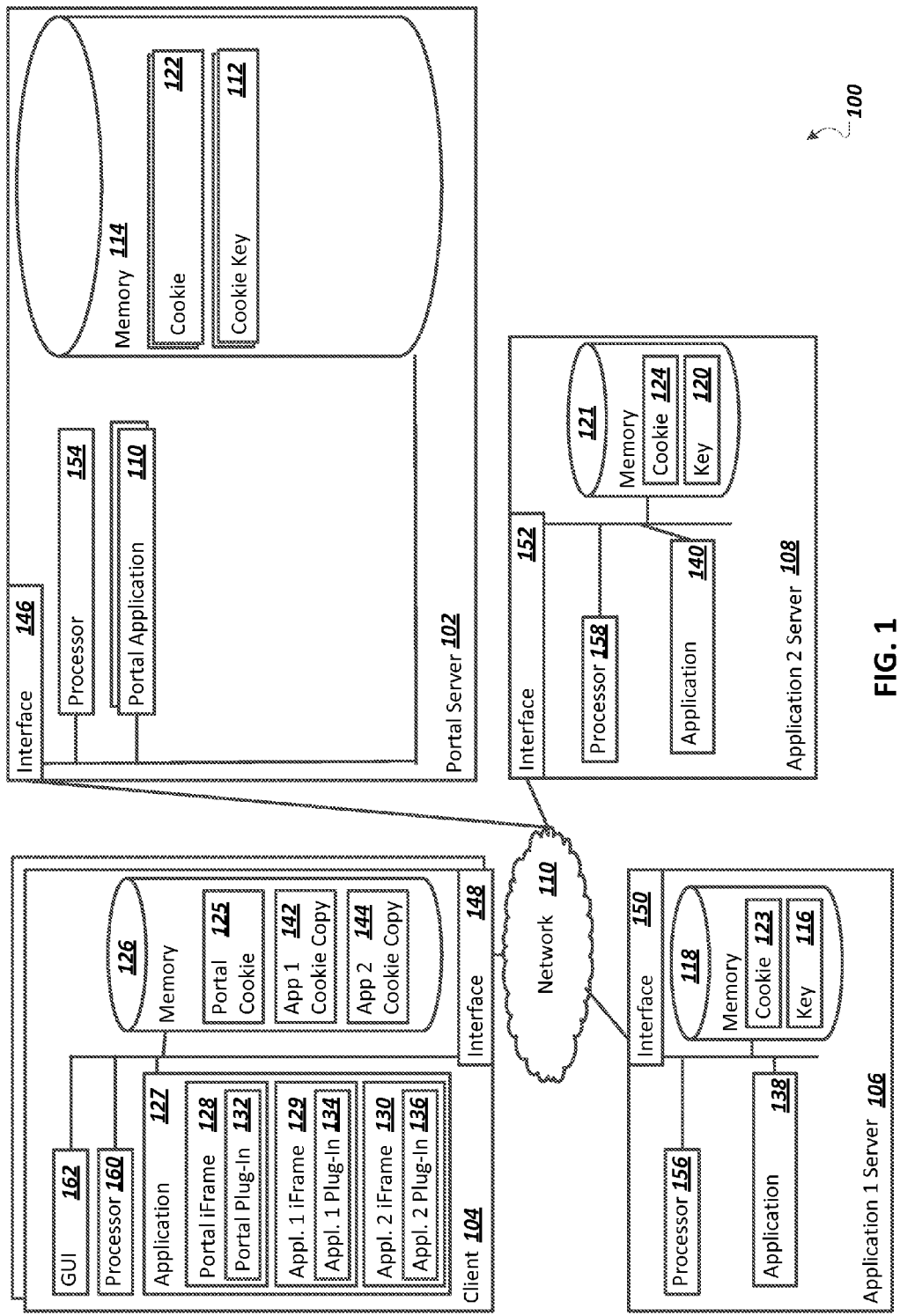
FIG. 1 is a block diagram illustrating an example system for sharing session state between portal application portlets associated with different domains.

FIG. 1 is a block diagram illustrating an example system 100 for sharing session state between portal application portlets associated with different domains. Specifically, the illustrated system 100 includes or is communicably coupled with a portal server 102, a client device 104, a first application server 106, a second application server 108, and a network 110. Although shown separately, in some implementations, functionality of two or more systems or servers may be provided by a single system or server.

The portal server 102 provides a portal application 110, such as to the client device 104. The portal application 110 can include an embedded application associated with the first application server 106 and an embedded application associated with the second application server 108. Upon initialization of the first application server 106 or the second application server 108, the respective first application server 106 or second application server 108 can send a request to the portal server 102 for a key 112 to use to decrypt information stored in a shared session cookie. The portal server 102 can provide the key 112 as a session-specific key which can be used to decrypt one or more cookies associated with a particular session. That is, in some implementations, the key 112 can only be used to decrypt cookies associated with the particular session and cannot be used to decrypt cookies associated with other sessions. Other sessions may be associated with other users, other roles of the same user, or other instances of a particular activity or process.

In some instances, the portal server 102 may send the key 112 to the respective application servers on their initial interaction with a particular session without receiving a specific request for the key 112 from those application servers. A key 112 can be stored, for example, in memory 114 of the portal server 102. In response to a request for the key 112, or upon determination that the key 112 should be provided, the portal server 102 can send a copy of the key 112 to the first application server 106 or the second application server 108. The provided key can be stored as a key 116 in memory 118 of the first application server 106 or as a key 120 in memory 121 of the second application server 108.

In some implementations, upon initialization of the first application server 106 or the second application server 108, the respective first application server 106 or second application server 108 sends a request to the portal server 102 for a copy of a shared session cookie 122. In response to a request for a copy of the shared session cookie 122, the portal server 102 can send a copy of the shared session cookie 122 to the first application server 106 or the second application server 108. The provided copy of the shared session cookie 122 can be stored as a cookie 123 in the memory 118 of the first application server 106 or as a cookie 124 in the memory 121 of the second application server 108.

The client device 104 may submit a request to the portal server 102 for the portal application 110. In response to the request, the portal server 102 can provide the portal application 110, or a presentation associated therewith, to the client device 104. The portal server 102 can also provide a copy of the shared session cookie 122. The copy of the shared session cookie 122 can be stored, for example, as a cookie 125 in memory 126 of the client device 104, in association with the domain of the portal server 102.

A received instance of the portal application 110 can execute on the client device 104, as illustrated by a client application 127. The client application 127 allows the client device 104 to request and view content on the client device 104. The client application 127 can use parameters, metadata, and other information received at launch to access a particular set of data from the portal server 102, the first application server 106, or the second application server 108.

The client application 127 can include user interface portions that are each associated with one of the portal server 102, the first application server 106, or the second application server 108, or some other application server. For example, the client application 127 can include a portal iFrame 128, a first application iFrame 129, and a second application iFrame 130. The portal iFrame 128, the first application iFrame 129, and the second application iFrame 130 respectively include a portal plug-in 132, a first application plug-in 134, and a second application plug-in 136. Each of the portal iFrame 128, the first application iFrame 129, and the second application iFrame 130 can include or be otherwise associated with other client-side assets such as one or more scripts. The portal plug-in 132, the first application plug-in 134, and the second application plug-in 136 are agents or client-side versions of the portal application 110, a first server application 138 associated with the first application server 106, and a second server application 140 associated with the second application server 108, respectively.

The first application plug-in 134 or some other client side asset associated with the first server application 138 can send a request to the first application server 106. The first application server 106 can include a copy of the cookie 123 in a response to the request. The copy of the cookie 123 can be stored as a first application cookie copy 142 in the memory 126 of the client device 104, in association with the domain of the first application server 106. Similarly, the second application plug-in 136 or some other client side asset associated with the second server application 140 can send a request to the second application server 108. The second application server 108 can include a copy of the cookie 124 in a response to the request. The copy of the cookie 124 can be stored as a second application cookie copy 144 in the memory 126 of the client device 104, in association with the domain of the second application server 108.

As part of the processing of a request from the first application plug-in 134 or some other client-side asset associated with the first server application 138, the first server application 138 can update the cookie 123. For example, the first server application 138 can perform logic which updates a setting which is included in or associated with shared session state included in the cookie 123. The first server application 138 can update one or more other cookies which are specific to the first server application 138 (e.g., that are not associated with session state shared within the context of the portal application 110). The first server application 138 can use the key 116 to decrypt the cookie 123, change a payload associated with the cookie 123, and increment a version number associated with the cookie 123. A copy of the updated cookie 123 (and possibly other cookies) can be included in a response sent to the client device 104.

The first application plug-in 134 can detect that a version number associated with the copy of the updated cookie 123 included in the response is different than a version number associated with the first application cookie copy 142 in the memory 126. The first application cookie copy 142 can be updated to match the copy of the updated cookie 123 included in the response from the first application server 106. In response to detection of the changed version number, the first application plug-in 134 can send a request to the portal plug-in 132 to forward the cookie update to other applications included in or associated with the portal application 110. For example, the first application plug-in 134 can send a cross-domain message to the portal iFrame 128 using a window.postMessage call. The window.postMessage call can include a copy of the updated cookie.

In response to receiving the request to forward the cookie update, the portal plug-in 132 can update the cookie 125 to match the copy of the updated cookie. In some implementations, the portal plug-in 132 sends an AJAX (Asynchronous JavaScript™ and XML (eXtensible Markup Language)) request to the portal server 102 to update the shared session cookie 122. The portal plug-in 132 can also send a cross-domain cookie update message to the second application plug-in 136, such as by using a window.postMessage call. The cookie update message can include a copy of the updated cookie. In response to receiving the cookie update message, the second application plug-in 136 can update the second application cookie copy 144 in the memory 126. In some implementations, the second application plug-in 136 sends an AJAX request to the second application server 108, to update the cookie 124. In implementations where an AJAX request is not sent to the second application server 108, the second application server 108 can receive the updated cookie in a next request sent to the second application server 108 by the client device 104.

In some implementations, a client-side component can initiate an update to a copy of the shared session cookie. For example, the second application plug-in 136 can perform logic which updates a setting included in the second application cookie copy 144. In some implementations, the second application plug-in 136 sends an AJAX request to the second application server 108, to update the cookie 124. In implementations where an AJAX request is not sent to the second application server 108, the second application server 108 can receive the updated cookie in a next request sent to the second application server 108 by the client device 104. The second application plug-in 136 can send a request to the portal plug-in 132 to send a cookie forward update, which can result in the eventual updating of the first application cookie copy 142, the cookie 125, the cookie 122, and the cookie 123.

In some implementations, a server-side component associated with the portal application 110 initiates an update to the shared session cookie 122. For example, as part of the processing of a request from the client device 104, the server-side component associated with the portal application 110 can update the shared session cookie 122. For example, the server-side component can perform logic which updates a setting which is included in or associated with shared session state included in the shared session cookie 122. The server-side component can use the cookie key 112 to decrypt the shared session cookie 122, can change a payload associated with the shared session cookie 122, and can increment a version number associated with the cookie 122. A copy of the updated shared session cookie 122 can be included in a response sent to the client device 104.

The portal plug-in 132 can detect that a version number associated with the copy of the updated shared session cookie 122 included in the response is different than a version number associated with the cookie 125. The cookie 125 can be updated to match the copy of the updated shared session cookie 122 included in the response from the portal server 102. In response to detection of the changed version number, the portal plug-in 132 can forward the cookie update to other applications included in or associated with the portal application 110. For example, the portal plug-in 132 can send cross-domain messages to the first application iFrame 129 and the second application iFrame 130 using window.postMessage calls. The window.postMessage calls can include a copy of the updated cookie.

As used in the present disclosure, the term "computer" is intended to encompass any suitable processing device. For example, although FIG. 1 illustrates a single portal server 102, a single client device 104, and two application servers, the system 100 can be implemented using two or more portal servers 102, two or more client devices 104, and more than two application servers. Indeed, the portal server 102, the client device 104, the first application server 106, and the second application server 108 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the portal server 102 and the client device 104 may be adapted to execute any operating system, including Linux, UNIX, Windows, Mac OS®, Java™, Android™, iOS or any other suitable operating system. According to one implementation, the portal server 102 may also include or be communicably coupled with an e-mail server, a Web server, a caching server, a streaming data server, and/or other suitable server.

Interfaces 146, 148, 150, and 152 are used by the portal server 102, the client device 104, the first application server 106, and the second application server 108, respectively, for communicating with other systems in a distributed environment—including within the system 100—connected to the network 110. Generally, the interfaces 146, 148, 150, and 152 each comprise logic encoded in software and/or hardware in a suitable combination and operable to communicate with the network 110. More specifically, the interfaces 146, 148, 150, and 152 may each comprise software supporting one or more communication protocols associated with communications such that the network 110 or interface's hardware is operable to communicate physical signals within and outside of the illustrated system 100.

The portal server 102, the first application server 106, and the second application server 108 each include one or more processors 154, 156, or 158, respectively. Each processor 154, 156, and 158 may be a central processing unit (CPU), a blade, an application specific integrated circuit (ASIC), a field-programmable gate array (FPGA), or another suitable component. Generally, each processor 154, 156, and 158 executes instructions and manipulates data to perform the operations of the portal server 102, the first application server 106, or the second application server 108, respectively. Specifically, each processor 154, 156, and 158 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The memory 114, 118, and 121 may include any type of memory or database module and may take the form of volatile and/or non-volatile memory including, without limitation, magnetic media, optical media, random access memory (RAM), read-only memory (ROM), removable media, or any other suitable local or remote memory component. The memory 114, 118, and 121 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the portal server 102, the first application server 106, or the second application server 108, respectively. In some implementations, the portal server 102, the first application server 106, and/or the second application server 108 include multiple memories.

The client device 104 may generally be any computing device operable to connect to or communicate with the portal server 102, the first application server 106, and the second application server 108 via the network 110 using a wireline or wireless connection. In general, the client device 104 comprises an electronic computer device operable to receive, transmit, process, and store any appropriate data associated with the system 100 of FIG. 1.

The client device 104 includes one or more processors 160. Each processor 160 included in the client device 104 may be a central processing unit (CPU), an application specific integrated circuit (ASIC), a field-programmable gate array (FPGA), or another suitable component. Generally, each processor 160 included in the client device 104 executes instructions and manipulates data to perform the operations of the client device 104. Specifically, each processor 160 included in the client device 104 executes the functionality required to send requests to the portal server 102, the first application server 106, and the second application server 108, and to receive and process responses from the portal server 102, the first application server 106, and the second application server 108.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the portal server 102, the first application server 106, the second application server 108, or the client device 104 itself, including digital data, visual information, or a graphical user interface (GUI) 162.

The GUI 162 of the client device 104 interfaces with at least a portion of the system 100 for any suitable purpose, including generating a visual representation of the client application 127. In particular, the GUI 162 may be used to view and navigate various Web pages. Generally, the GUI 162 provides the user with an efficient and user-friendly presentation of business data provided by or communicated within the system. The GUI 162 may comprise a plurality of customizable frames or views having interactive fields, pull-down lists, and buttons operated by the user. The GUI 162 contemplates any suitable graphical user interface, such as a combination of a generic web browser, intelligent engine, and command line interface (CLI) that processes information and efficiently presents the results to the user visually.

The memory 126 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 126 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the portal server 102, the first application server 106, the second application server 108, and/or the network 110, or any other number suitable to the purposes of the system 100. Additionally, there may also be one or more additional client devices 104 external to the illustrated portion of system 100 that are capable of interacting with the system 100 via the network 110. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
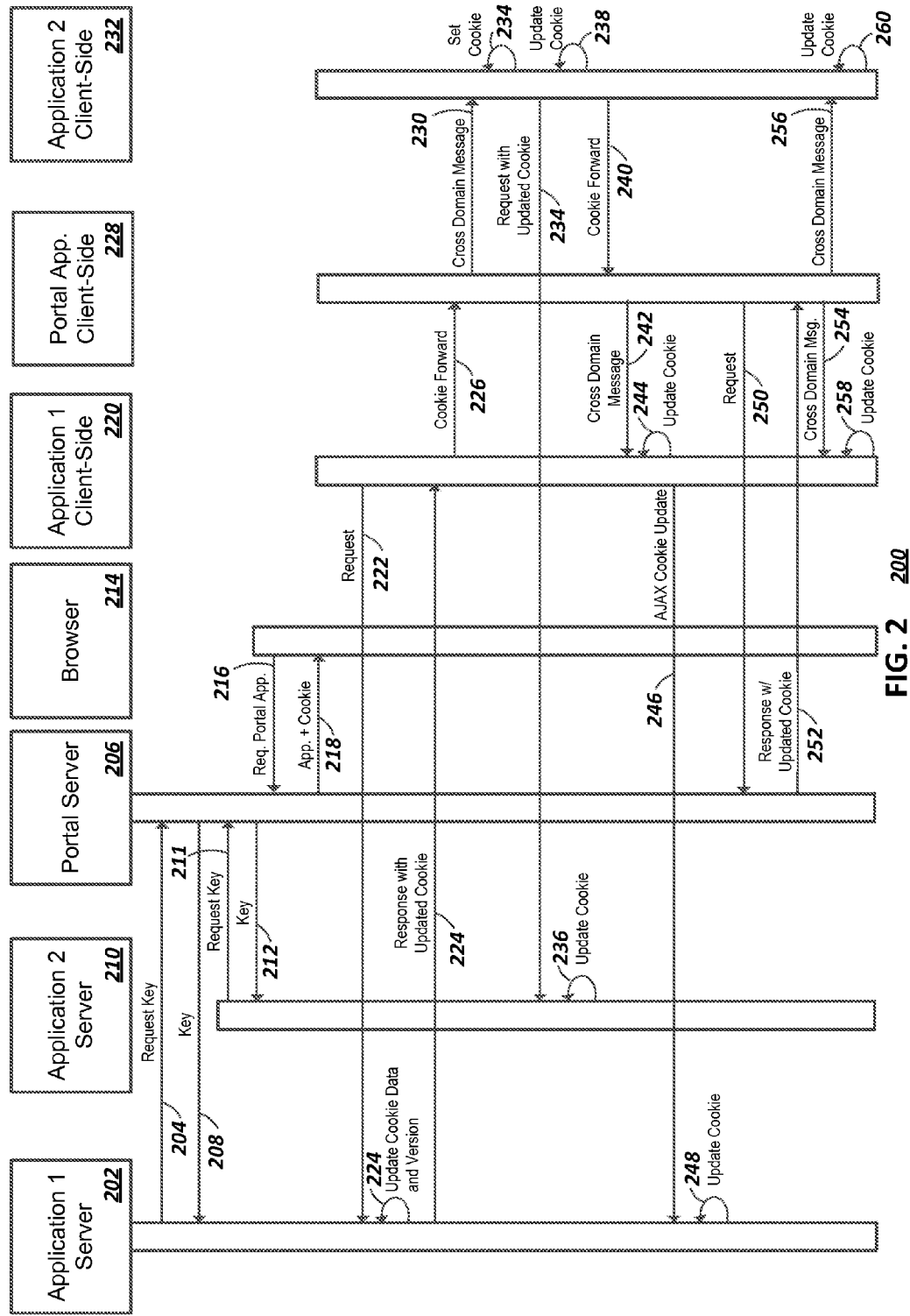
FIG. 2 is a swim lane diagram illustrating communication between components in a system for sharing session state between portal application portlets associated with different domains.

FIG. 2 is a swim lane diagram illustrating communication between components in a system for sharing session state between portal application portlets that are associated with different domains. It will be understood that the processing and communications illustrated in FIG. 2 may be performed, for example, by any suitable system, environment, software, and hardware, or a combination of systems, environments, software, and hardware, as appropriate. For example, one or more of a client, a server, or other computing device can be used to perform the processing and communications illustrated in FIG. 2 and obtain any data from the memory of a client, the server, or the other computing device. In some implementations, the processing illustrated in FIG. 2 is executed by the system 100 described above with respect to FIG. 1.

Upon initialization of a first application server 202, the first application server 202 sends a request 204 for a cookie key to a portal server 206. The portal server 206 sends a response 208 that includes the key. In some implementations the response 208 includes a copy of a shared session cookie associated with the domain of the portal server 206. In such implementations, the first application server 202 can create a first-domain cookie that is associated with the domain of the first application server 202 using the copy of the shared session cookie, and can store the first-domain cookie at the first application server 202.

Upon initialization of a second application server 210, the second application server 210 sends a request 211 for a cookie key to the portal server 206. The portal server 206 sends a response 212 that includes the key. In some implementations the response 212 includes a copy of the shared session cookie. In such implementations, the second application server 210 can create a second-domain cookie associated with the domain of the second application server 210, using the copy of the shared session cookie, and can store the second-domain cookie at the second application server 210.

A browser 214 included in a client device sends a request 216 to the portal server 206 for a portal application that is associated with the first application server 202 and the second application server 210. The portal server 206 sends a response 218 that includes the portal application and the shared session cookie. The shared session cookie can be stored by the browser 214.

In response to user interaction with a portlet associated with the first application server 202, a client-side component 220 associated with the first application server 202 sends a request 222 to the first application server 202. The first application server 202 can perform server logic that includes the updating 224 of data associated with the first-domain cookie. The first application server 202 can update a version number associated with the first-domain cookie. The first application server 202 sends a response 224 that includes the updated first-domain cookie to the client-side component 220.

The client-side component 220 can detect a change in the version number of the first-domain cookie included in the response received from the first application server 202. The client-side component 220 can send a request 226 to a portal client-side component 228 to forward a cookie update to other applications. The request 226 can include a copy of the updated first-domain cookie.

The portal client-side component 228 can send a cross-domain message 230 that includes the updated first-domain cookie to a client-side component 232 associated with the second application server 210. The cross-domain message 230 can be sent, for example, to an iFrame component associated with the client-side component 232 using a window.postMessage( ) call. The client-side component 232 can set (234) a second-domain cookie in the domain of the second application server 210, such as using a JavaScript setCookie( ) function call, to create or update a cookie stored by the browser 214 to match the updated first-domain cookie included in the cross-domain message. In some implementations, the client-side component 232 is configured to send an AJAX request upon setting the second-domain cookie, to automatically send the second-domain cookie stored by the browser 214 to the second application server 210. In some implementations, the stored second-domain cookie is not sent automatically by the client-side component 232 upon a cookie update, but is sent when a next request is sent to the second application server 210. For example, the client-side component 232 can send a request 234 to the second application server 210 in response to user interaction with a portlet associated with the second application server 210, where the request 234 includes a copy of the stored second-domain cookie. Upon receipt of the request 234, the second application server 210 can update (236) a copy of the second-domain cookie accessible to the second application server 210.

The client-side component 232 can, at a later point in time, update 238 a stored copy of the second-domain cookie stored by the browser 214 (e.g., using a setCookie( ) function call), such as in response to user interaction. The cookie update can include the incrementing of a version number associated with the second-domain cookie. The client-side component 232 can send a request 240 to the portal client-side component 228 (e.g., using a window.postMessage( ) call) to forward the cookie update to other applications. The portal client-side component 228 can send a cross-domain message 242 (e.g., using window.postMessage( ) that includes the updated second-domain cookie to the client-side component 220.

The client-side component 220 can update 244 the first-domain cookie stored by the browser 214 (e.g., using setCookie( )) to match the updated second-domain cookie included in the cross-domain message 242. In implementations where the client-side component 220 is configured to automatically send an AJAX request to the first application server 202 upon updating the first-domain cookie, the client-side component 220 sends an AJAX request 246 to the first application server 202. The first application server 202 can update 248 a copy of the first-domain cookie accessible to the first application server 202 in response to the AJAX request 246.

The portal client-side component 228 can receive an update to the shared session cookie from the portal server 206. For example, the portal client-side component 228 can send a request 250 to the portal server 206 and can receive a response 252 that includes an update to the shared session cookie. For example, processing in the portal server 206 can change the shared session cookie. The change to the shared session cookie can include incrementing a version number associated with the shared session cookie.

Upon receipt of the response 252, the portal client-side component 228 can detect a change in the version number of shared session cookie and can send cookie update requests as cross-domain messages 254 and 256 (e.g., using window.postMessage( )) to the client-side component 220 and the client-side component 232, respectively. The client-side component 220 can update 258 the first-domain cookie stored by the browser 214 in response to the cross-domain message 254 (e.g., using setCookie( )). The client-side component 232 can update 260 the second-domain cookie stored by the browser 214 in response to the cross-domain message 256 (e.g., using setCookie( )).

Figure 3:
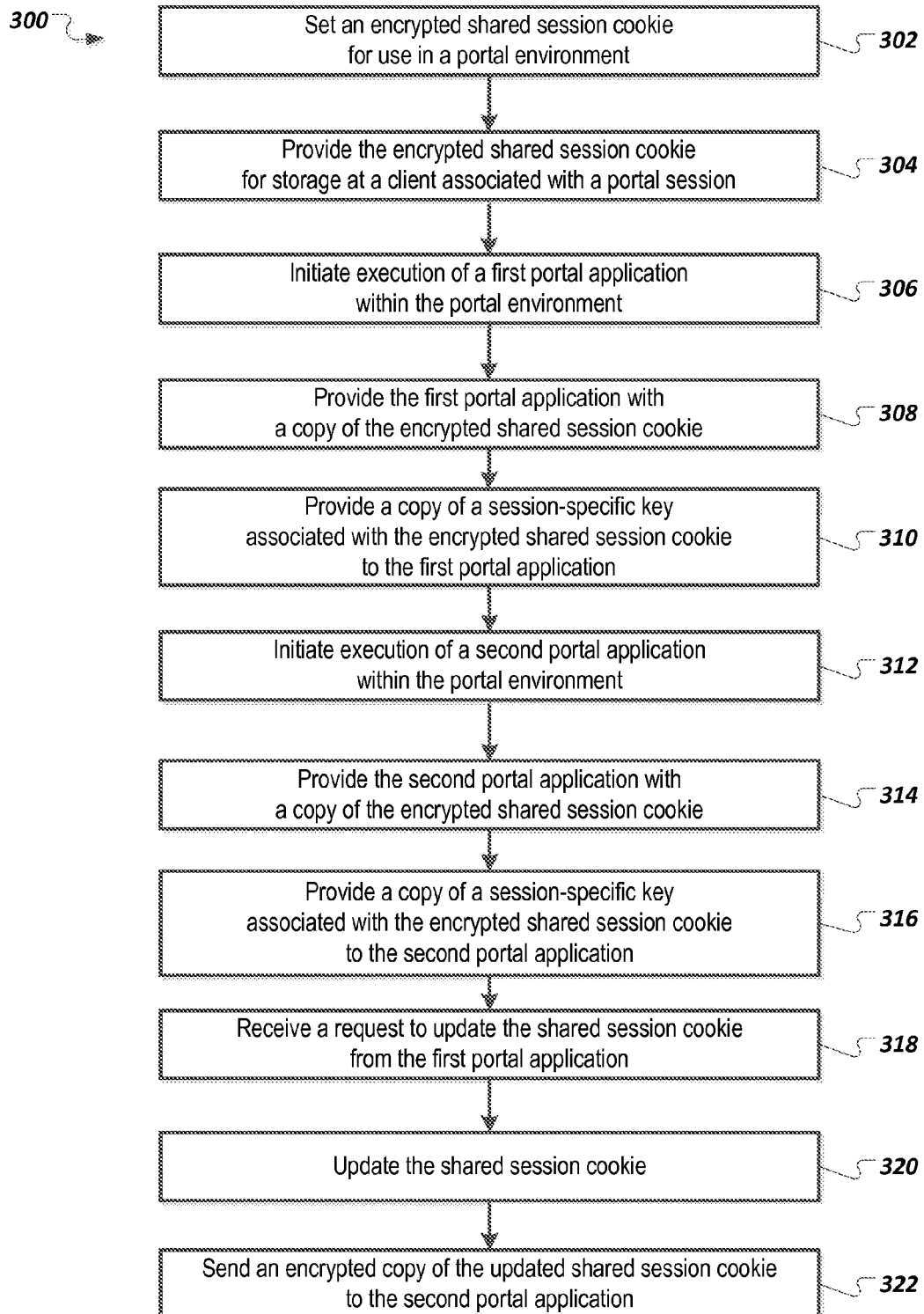
FIG. 3 is a flowchart of an example method for sharing session state between portal application portlets associated with different domains.

FIG. 3 is a flowchart of an example method 300 for sharing session state between portal application portlets associated with different domains. It will be understood that method 300 and related methods may be performed, for example, by any suitable system, environment, software, and hardware, or a combination of systems, environments, software, and hardware, as appropriate. For example, one or more of a client, a server, or other computing device can be used to execute method 300 and related methods and obtain any data from the memory of a client, the server, or the other computing device. In some implementations, the method 300 and related methods are executed by the system 100 described above with respect to FIG. 1.

At 302, a shared session cookie is set for use in a portal environment, the shared session cookie encrypted with a corresponding key, the shared session cookie storing at least a portion of a session state associated with a current portal session. The shared session cookie can include, for example, a payload and a version identifier. The payload can store the session state data of the shared session cookie, such as in a JSON format. The version identifier defines a version of the shared session cookie and can be used by portal applications to determine if an updated shared session state is available. In some implementations, the payload is encrypted within the encrypted shared session cookie and the version identifier is not encrypted. In some implementations, the version information is not encrypted.

At 304, the encrypted shared session cookie is provided for storage at the client associated with the portal session. For example, the shared session cookie can be provided to the client when a portal web page is provided to the client in response to a request received from the client for the portal web page.

At 306, execution of a first portal application is initiated within the portal environment. For example, a first portal server associated with the first portal application can be initialized and the first portal application can be launched. As another example, a client-side agent or version of the first portal application can be initialized at the client.

At 308, the first portal application is provided with a copy of the encrypted shared session cookie. For example, the copy of the encrypted shared session cookie can be provided to the first portal application, using, for example, an API (Application Programming Interface) or a web interface.

At 310, a copy of the session-specific key associated with the encrypted shared session cookie is provided to the first portal application. For example, the copy of the session-specific key can be provided to the first portal application, using, for example, an API or a web interface. The provided copy of the session-specific key can be used to decrypt the shared session cookie at the first portal application. The session state stored in the shared session cookie can be used to set at least a portion of the session state of the first portal application. The session state can be associated, for example, with execution of the first portal application.

At 312, execution of a second portal application within the portal environment is initiated within the portal environment. For example, a second portal server associated with the second portal application can be initialized and the second portal application can be launched. As another example, a client-side agent or version of the second portal application can be initialized at the client. The second portal application is associated with a different domain than the first portal application.

At 314, the second portal application is provided with a copy of the encrypted shared session cookie. For example, the copy of the encrypted shared session cookie can be provided to the first portal application, using, for example, an API or a web interface.

At 316, a copy of the session-specific key associated with the encrypted shared session cookie is provided to the second portal application. For example, the copy of the session-specific key can be provided to the second portal application, using, for example, an API or a web interface. The provided copy of the session-specific key can be used to decrypt the shared session cookie at the second portal application. The session state stored in the shared session cookie can be used to set at least a portion of the session state of the second portal application. The session state can be associated, for example, with execution of the second portal application.

At 318, a request is received to update the shared session cookie from the first portal application based on at least one change to the session state. The change to the session state can be associated with execution of the first portal application. In some instances, the first portal application may provide an already updated shared session cookie along with its request, where the request is sent to cause propagation of the updated shared session cookie.

At 320, the shared session cookie is updated based on the at least one change to the session state. The shared session key can be used to encrypt the changed session state within the shared session cookie. A version number associated with the shared session cookie can be incremented.

At 322, an encrypted copy of updated shared session cookie is sent to the second portal application. For example, the encrypted copy of the shared session cookie can be sent to the second portal application, using, for example, an API or a web interface. The shared session cookie can then be used to update the cookie associated with the second portal application, in effect updating the cookie across domains in the shared session.

FIG. 4A is a flowchart of an example method 400 for initializing an application server. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by the system 100 described above with respect to FIG. 1.

At 402, an application server startup sub-process is invoked. The application server startup sub-process can be invoked, for example, for a particular application server and can be invoked each time an application server that is associated with a portal environment is initialized.

At 404, the application server receives a cookie key and one or more cookie names from a portal server in response to a request for the cookie key and cookie names.

As indicated by a note 406, the cookie key can be used, for example, to encrypt and decrypt content associated with a shared session cookie. The cookie names can be, for example, names of cookies included in an array of cookies.

FIG. 4B is a flowchart of an example method 407 for updating a shared session cookie. It will be understood that method 407 and related methods may be performed, for example, by any suitable system, environment, software, and hardware, or a combination of systems, environments, software, and hardware, as appropriate. For example, one or more of a client, a server, or other computing device can be used to execute method 407 and related methods and obtain any data from the memory of a client, the server, or the other computing device. In some implementations, the method 408 and related methods are executed by the system 100 described above with respect to FIG. 1.

At 408, an update shared session cookie sub-process is invoked, such as in response to an application associated with the application server updating the shared session cookie.

At 410, the application updates the cookie (e.g., using a setCookie( ) call) and increments a version number associated with the cookie.

At 412, the application requests a cross-domain cookie forward operation, such as from a component associated with the portal server.

FIG. 4C is a flowchart of an example method 413 for forwarding a cookie update. It will be understood that method 413 and related methods may be performed, for example, by any suitable system, environment, software, and hardware, or a combination of systems, environments, software, and hardware, as appropriate. For example, one or more of a client, a server, or other computing device can be used to execute method 413 and related methods and obtain any data from the memory of a client, the server, or the other computing device. In some implementations, the method 413 and related methods are executed by the system 100 described above with respect to FIG. 1.

At 414, a cross-domain cookie forward sub-process is invoked, for example, in response to the request from the application. The cross-domain cookie forward sub-process can be invoked, for example, for every application associated with the portal environment.

At 416, a determination is made for a given application whether the given application is the application that requested the cookie forward operation. If the given application is the application that requested the cookie forward operation, no forwarding is necessary, and the cookie forward sub-process completes for that application.

If the given application is not the application that requested the cookie forward operation, the cookie is re-created in the application using cross-domain communication, at 418. For example, the application can receive a cross-domain message that includes the shared session cookie. The application can re-create the cookie by creating or setting a cookie in the domain of the application and by copying data from the received shared session cookie to the created or set cookie.

At 420, a determination is made as to whether a "cookie always in sync" mode is true for the application. The "cookie always in sync" mode can be set so that a notification is automatically sent to an application server in response to a cookie update occurring at a client device.

If the "cookie always in sync" mode is true for the application, a cookie update request (e.g., an AJAX request) is sent to the application server associated with the application, at 422. The cookie update request can be processed, for example, as described above with respect to FIG. 3.

If the "cookie always in sync" mode is not true for the application, an update request is not sent to the application server, as indicated by a note 424. The updated cookie can be subsequently sent to the application server the next time the application sends a request to the application server.

Figure 5:
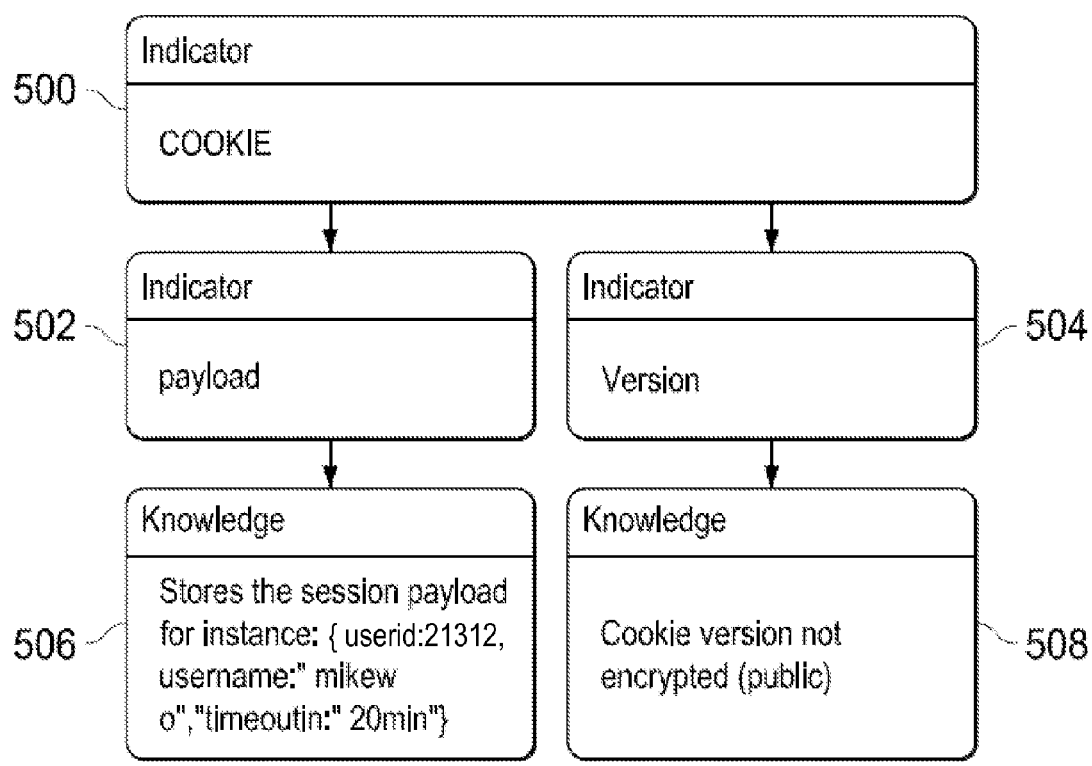
FIG. 5 illustrates an example cookie data structure.

FIG. 5 illustrates an example cookie data structure 500. The cookie data structure 500 includes a payload 502 and a version 504. As indicated by a note 506, the payload 502 stores session data associated with a portal session. The payload 502 can be, for example, in JSON format. The payload 502 can include a set of name-value pairs. For example, the payload 502 can include: {userid:21312, username:"mikew", timeout:20 min}. The payload 502 can be encrypted. A key can be used to decrypt the payload 502. The version 504 can be used to associate a version number with the cookie. The version can be unencrypted (e.g., the version 504 may be readable without being decrypted). The version 504 can be incremented each time the payload 502 is updated.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method executed by one or more processors, the method comprising:
    setting a shared session cookie for use in a portal environment, the shared session cookie encrypted with a corresponding session-specific key, the portal environment executing a plurality of portal page components within the portal environment, the shared session cookie storing at least a portion of a session state associated with a current portal session;
    providing the encrypted shared session cookie for storage at the client associated with the portal session of the portal environment;
    initiating execution of a first portal application associated with a first portal page component provided within the portal environment, wherein the first portal application is provided with a copy of the encrypted shared session cookie;
    providing a copy of the session-specific key associated with the encrypted shared session cookie to the first portal application, wherein the provided copy of the session-specific key is used to decrypt the shared session cookie at the first portal application, and wherein the session state stored in the shared session cookie is used to set at least a portion of the session state of the first portal application;
    receiving a request to update the shared session cookie from the first portal application based on at least one change to the session state, the at least one change based on a change to the session state associated with execution of the first portal application; and
    updating the shared session cookie based on the at least one change to the session state; and
    sending an encrypted copy of the updated shared session cookie to a second portal application associated with a second portal page component concurrently executing within the portal environment and associated with the current portal session, the second portal application associated with a different domain than the first portal application.

2. The method of claim 1, further comprising:
    initiating execution of the second portal application within the portal environment, wherein the second portal application is provided with a copy of the encrypted shared session cookie upon initiation; and
    providing a copy of the session-specific key associated with the encrypted shared session cookie to the second portal application in response to initiation of the second portal application, wherein the provided copy of the session-specific key is used to decrypt the shared session cookie at the second portal application, and wherein the session state stored in the shared session cookie is used to set at least a portion of the session state of the second portal application.

3. The method of claim 1, wherein a version identifier associated with the shared session cookie is increased in response to updating the shared session cookie.

4. The method of claim 1, wherein the shared session cookie includes a payload and a version identifier.

5. The method of claim 4, wherein only the payload is encrypted within the encrypted shared session cookie.

6. The method of claim 4, wherein the payload stores the session state data of the shared session cookie in a Javascript Object Notation (JSON) format.

7. The method of claim 4, wherein the version identifier defines a version of the shared session cookie, and wherein the version identifier is used by portal applications to determine if an updated shared session state is available.

8. The method of claim 1, wherein the key corresponding to the shared session cookie is associated with two or more portal sessions.

9. The method of claim 1, wherein sending the encrypted copy of the updated shared session cookie to the second portal application includes:
    in response to detecting the updated shared session cookie, sending, by the first portal application to a portal plug-in associated with the portal environment, a request to send the updated shared session cookie to the second portal application using a cross-domain message sent via an iFrame associated with the portal plug-in, wherein the encrypted copy of the updated shared session cookie is sent by the portal environment in response to receiving the cross-domain message.

10. The method of claim 9, wherein sending the encrypted copy of the updated shared session cookie in response to receiving the cross-domain message includes sending, by the portal plug-in to a plug-in associated with the second portal application, a cross-domain message including the encrypted updated shared session cookie.

11. A system comprising:
    one or more computers associated with an enterprise portal; and
    a computer-readable medium coupled to the one or more computers having instructions stored thereon which, when executed by the one or more computers, cause the one or more computers to perform operations comprising:
    setting a shared session cookie for use in a portal environment, the shared session cookie encrypted with a corresponding session-specific key, the portal environment executing a plurality of portal page components within the portal environment, the shared session cookie storing at least a portion of a session state associated with a current portal session;

providing the encrypted shared session cookie for storage at the client associated with the portal session of the portal environment;

initiating execution of a first portal application associated with a first portal page component provided within the portal environment, wherein the first portal application is provided with a copy of the encrypted shared session cookie;

providing a copy of the session-specific key associated with the encrypted shared session cookie to the first portal application, wherein the provided copy of the session-specific key is used to decrypt the shared session cookie at the first portal application, and wherein the session state stored in the shared session cookie is used to set at least a portion of the session state of the first portal application receiving a request to update the shared session cookie from the first portal application based on at least one change to the session state, the at least one change based on a change to the session state associated with execution of the first portal application;

updating the shared session cookie based on the at least one change to the session state; and sending an encrypted copy of the updated shared session cookie to a second portal application associated with a second portal page component concurrently executing within the portal environment and associated with the current portal session, the second portal application associated with a different domain than the first portal application.

12. The system of claim 11, the operations further comprising:

initiating execution of the second portal application within the portal environment, wherein the second portal application is provided with a copy of the encrypted shared session cookie upon initiation; and providing a copy of the session-specific key associated with the encrypted shared session cookie to the second portal application in response to initiation of the second portal application, wherein the provided copy of the session-specific key is used to decrypt the shared session cookie at the second portal application, and wherein the session state stored in the shared session cookie is used to set at least a portion of the session state of the second portal application.

13. The system of claim 11, wherein a version identifier associated with the shared session cookie is increased in response to updating the shared session cookie.

14. A computer program product encoded on a non-transitory storage medium, the product comprising non-transitory, computer readable instructions for causing one or more processors to perform operations comprising:

setting a shared session cookie for use in a portal environment, the shared session cookie encrypted with a corresponding session-specific key, the portal environment executing a plurality of portal page components within the portal environment, the shared session cookie storing at least a portion of a session state associated with a current portal session;

providing the encrypted shared session cookie for storage at the client associated with the portal session of the portal environment;

initiating execution of a first portal application associated with a first portal page component provided within the portal environment, wherein the first portal application is provided with a copy of the encrypted shared session cookie;

providing a copy of the session-specific key associated with the encrypted shared session cookie to the first portal application, wherein the provided copy of the session-specific key is used to decrypt the shared session cookie at the first portal application, and wherein the session state stored in the shared session cookie is used to set at least a portion of the session state of the first portal application;

receiving a request to update the shared session cookie from the first portal application based on at least one change to the session state, the at least one change based on a change to the session state associated with execution of the first portal application; and updating the shared session cookie based on the at least one change to the session state; and sending an encrypted copy of the updated shared session cookie to a second portal application associated with a second portal page component concurrently executing within the portal environment and associated with the current portal session, the second portal application associated with a different domain than the first portal application.

15. The product of claim 14, the operations further comprising:

initiating execution of the second portal application within the portal environment, wherein the second portal application is provided with a copy of the encrypted shared session cookie upon initiation; and providing a copy of the session-specific key associated with the encrypted shared session cookie to the second portal application in response to initiation of the second portal application, wherein the provided copy of the session-specific key is used to decrypt the shared session cookie at the second portal application, and wherein the session state stored in the shared session cookie is used to set at least a portion of the session state of the second portal application.

16. The product of claim 14, wherein a version identifier associated with the shared session cookie is increased in response to updating the shared session cookie.

* * * * *